(12) United States Patent
Killat

(10) Patent No.: US 6,448,745 B1
(45) Date of Patent: Sep. 10, 2002

(54) CONVERTER WITH INDUCTOR AND DIGITAL CONTROLLED TIMING

(75) Inventor: Dirk Killat, Kirchheim (DE)

(73) Assignee: Dialog Semiconductor GmbH, Kirchheim-Nabern (DE)

(*) Notice: Subject to any disclaimer, the term of this patent is extended or adjusted under 35 U.S.C. 154(b) by 0 days.

(21) Appl. No.: 10/042,073

(22) Filed: Jan. 8, 2002

(51) Int. Cl.$^7$ ................................................. G05F 1/10
(52) U.S. Cl. ........................ 323/222; 323/283; 323/212
(58) Field of Search ................................. 323/222, 281, 323/283, 284, 208, 211, 212

(56) References Cited

U.S. PATENT DOCUMENTS

| | | | |
|---|---|---|---|
| 5,757,166 A | 5/1998 | Sodhi ........................... | 323/222 |
| 5,861,734 A | 1/1999 | Fasullo et al. ............... | 323/222 |
| 5,920,471 A | * 7/1999 | Rajagopalan et al. ........ | 323/288 |
| 6,043,633 A | 3/2000 | Lev et al. .................... | 323/222 |
| 6,178,104 B1 | 1/2001 | Choi ............................ | 363/89 |
| 6,373,725 B1 | * 4/2002 | Chang et al. ................ | 323/222 |

\* cited by examiner

Primary Examiner—Shawn Riley
(74) Attorney, Agent, or Firm—George O. Saile; Stephen B. Ackerman

(57) ABSTRACT

An apparatus and a method for controlling a converter of electronic power supply energy embodied for example as a boost converter or as a boost converter with a power factor correction (PFC) or being used as a DC to DC converter that is running in a discontinuous mode and which is using an equation to calculate the point of time of the zero current state of the storage inductor based on the ON time of the shunt switch and the voltages at the source and the load side. This method achieves a maximum power transfer by recharging of the storage inductor right after the zero current state is reached. The accuracy of the voltage measurement is increased by calibration of the source and load voltage dividers. Minimizing distortion and harmonics is achieved by a fine adjustment of the energy transfer through fine-tuning of the pulse width of the switch overcoming the limitations of discrete time steps in clocked digital systems by toggling between neighboring ON time values of the switch.

25 Claims, 5 Drawing Sheets

CONVERTER WITH INDUCTOR AND DIGITAL CONTROLLED TIMING

BACKGROUND OF THE INVENTION (1) Field of the Invention

The present invention relates to the general subject of electronic power supply converters for energy wherein one example is a boost converter system having a power factor correction (PFC) that is running in discontinuous mode using an equation to calculate the point of time the zero-current state of the storage inductor occurs without the requirement of a secondary winding or special voltage comparators to detect zero current to achieve maximum power transfer and to avoid a continuous mode operation.

(2) Description of the Prior Art

The design of a boost converter system with a power factor converter (PFC) requires small storage inductors together with high transferred power. These two parameters are counteracting against each other. The transferred power reaches its maximum if the storage inductor is recharged right after the inductor reaches the zero current state.

Prior art power supplies are using either secondary windings, special voltage comparators or analog current sensing circuits to detect the zero-current state of the storage inductor.

U.S. Pat. No. 5,757,166 to Sodhi teaches a power correction factor boost converter. A secondary winding is used for zero current detection of the storage inductor.

U.S. Pat. No. 5,861,734 to Fasullo et al describes a control system for a boost converter using 2 interleaved boost circuits. A current sensing circuit is provided that senses the current in each of the boost converters. 2 boost converter switches have to be controlled.

U.S. Pat. No. 6,178,104 B1 to Nak-Choon-Choi describes a power factor correction circuit using reverse saw tooth waves. The switch is coupled to a resistor and a capacity that by forming a current detector, detect the current flowing through the storage inductor of the boost converter. The PFC circuit is using reverse saw tooth waves and is controlling the slope of the current.

Fine adjustment of the energy transfer overcoming the limitations of discrete time in digital systems is a known problem. U.S. Pat. No. 6,043,633 to Lev et al. discloses a method and an apparatus for controlling a boost converter that offers power factor correction by compensating for the parasitic capacitance and parasitic oscillations. A zero current detector facilitates the compensation. A dithering method to enhance the time resolution of clocked digital circuits is presented.

SUMMARY OF THE INVENTION

A principal object of the present invention is to provide a highly effective electronic power supply converter such as a boost converter having maximum power, related to the size the of the storage inductor, transferred without the requirement of a secondary winding or voltage comparators.

A further object of the present invention is to provide a highly effective boost converter with a power factor corrector (PFC) having maximum power, related to the size the of the storage inductor, transferred without the requirement of a secondary winding or voltage comparators.

A further object of the present invention is to recharge the storage inductor right after the point of time when zero current state occurs at the storage inductor. This is key to a maximal transfer of energy.

A still further object of the present invention is to achieve a fine adjustment of the energy transfer to minimise distortion and harmonics overcoming the limitations of discrete time steps in clocked digital systems.

Another still further object of the present invention is to achieve an optimal accuracy of the measurement of the voltages at the source and the load side to achieve best accuracy to define the point of time of the zero current state of the storage inductor and furthermore to achieve best accuracy required as input for the fine-tuning of the energy transferred.

Another still further object of the present invention is to achieve less manufacturing costs and to reduce the number of components required by avoiding secondary windings or voltage comparators for the zero current detection.

In accordance with the objects of this invention a system used for converting electronic power supply energy has been achieved. This system can be used as a boost converter or a DC to DC converter. Maximal power is transferred by recharging the storage inductor right after the point of time when zero current occurs at the storage inductor, As an example of the usage of the invention a boost converter with PFC (power-factor-corrector) having maximal power transferred related to the size of the storage inductor by recharging the storage inductor right after the point of time when zero current state occurs at the storage inductor is achieved. FIG. 1 illustrates the main components of the system. The boost converter is including a storage inductor coupled to an input voltage, a shunt switch controlling a current flowing through said storage inductor and a rectifying diode for rectifying the output voltage. Furthermore the system comprises of an analogue/digital converter which is converting analogue values measured and reference voltages into digital values required by a digital control unit to control frequency and pulse width of the shunt switch using means to calculate the point of time when zero current state occurs instead of detecting this point of time using secondary windings or other analog circuits. Said digital control unit initiates the recharging of the storage inductor right after the point of time of the zero current state is reached.

In accordance with an object of the invention a method of calculating the point of time of the zero current state of the storage inductor is achieved. Said point of time is calculated using an equation based on the ON time of said shunt switch and the voltages measured at the source side (rectified mains supply) and the load side. A safety margin to balance inaccuracies of the measurement is added to this calculated point of time.

In accordance with another object of the invention to minimize distortion and harmonics a fine adjustment of the energy transfer through fine tuning of the pulse width of the shunt switch is introduced overcoming the limitations of discrete time steps in clocked digital systems. This is achieved by either using patterns or by a digital delta sigma modulator that is averaging the ON time values of the shunt switch by toggling between neighboring ON time values (pulse-width) and controlled by said digital control unit.

In accordance to the object of this invention the calculation of the point of time of the zero current state of the storage inductor and the fine-tuning of the energy transferred require a very high accuracy of the measurement of the voltages at the load side, the inductor side and at the source side. This is achieved by a calibration of the tolerances of the voltage dividers used for these measurements. The voltage divider ratios can be measured at appropriate periods of time (see FIG. 7) considering the small influence of the voltage of the forward bias of the diode in the magnitude of 0.7 volt hence. This calibration enables the usage of tolerant voltage dividers. Said digital control unit is controlling the calibration of said voltage dividers.

In accordance with the objects of the invention said three methods of (1) calculating the point of time of the zero state of the storage inductor and (2) of fine tuning the energy transfer and (3) of calibrating the voltage dividers to improve the accuracy of the voltages measured can all be used separately or used in any combinations together.

BRIEF DESCRIPTION OF THE DRAWINGS

In the accompanying drawings forming a material part of this description, there is shown.

DESCRIPTION OF THE PREFERRED EMBODIMENTS

Figure 1:
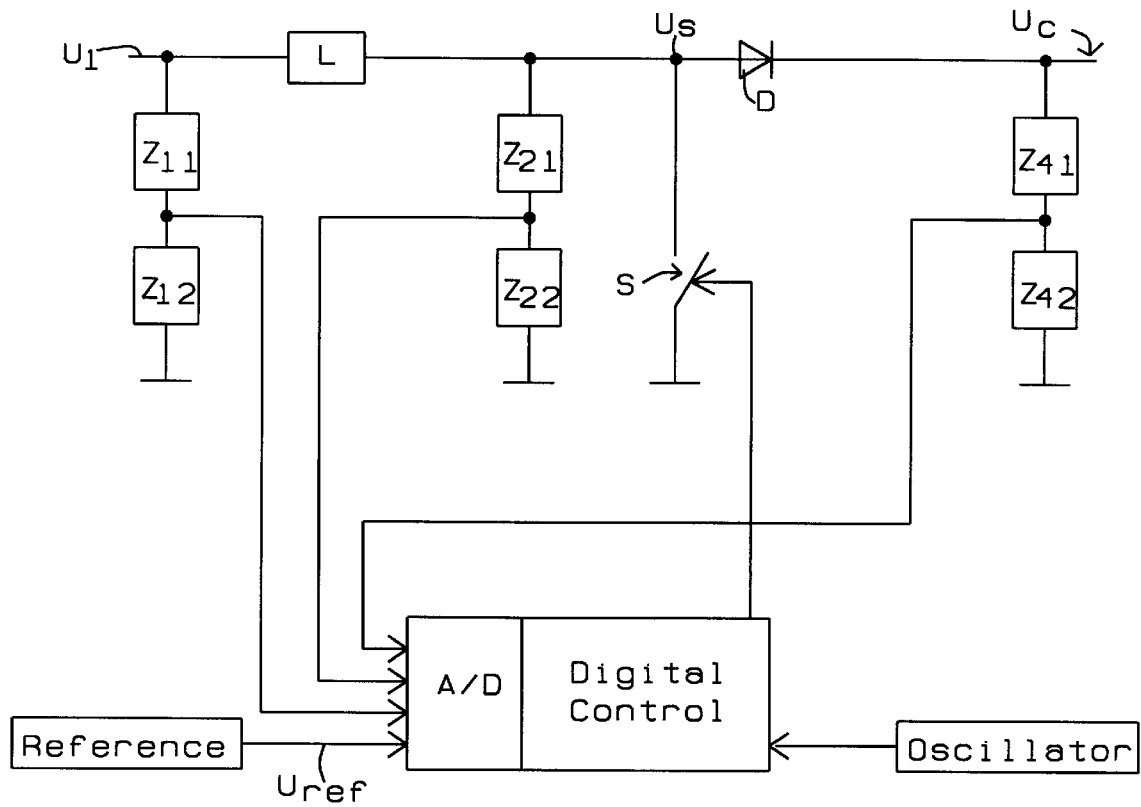
FIG. 1 illustrates the preferred principal embodiment of the PFC (Power-Factor-Corrector) boost converter consisting of one storage inductor, a rectifier diode, a shunt switch, voltage dividers and a control unit containing an analog-to-digital converter, a delta-sigma modulator and a logical unit.

The preferred embodiments disclose a novel system used as converters for energy in electronic power supply systems. Said system, running in discontinuous mode, can be used in simple boost converters or in boost converters having a PFC (power-factor-correction) or can be used as an DC-to-DC converter that is running in a discontinuous mode. Some parts of the invention are applicable to other power electronic systems as well. The design of such converters requires small inductors together with maximal power transferred. These two parameters are counteracting against each other. The power transferred reaches its maximum when the storage inductor is recharged immediately after reaching the zero current state. For the detection of the zero current generally a secondary winding at the storage inductor is used. As an example of the invention a configuration of the principal components of a boost converter with PFC is shown in FIG. 1. The main components are the storage inductor L, the rectified main supply U1, the shunt switch S, the rectifier diode D, the voltage dividers pairs $Z_{11}$–$Z_{12}$, $Z_{21}$–$Z_{22}$ and $Z_{41}$–$Z_{42}$ are used for the measurement of the voltages of the mains supply U1, the voltage of the inductor output Us, the voltage at the load side Uc, the reference voltage Uref and a oscillator driven digital control unit to control the frequency and pulse width of the shunt switch S.

Figure 2A:
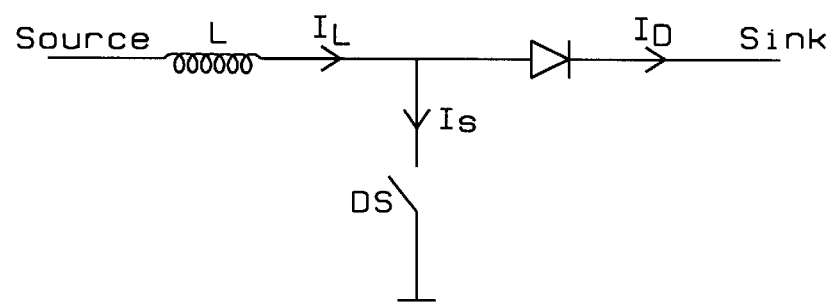
FIG. 2A illustrates the principal currents of the power supply.
Figure 2B:
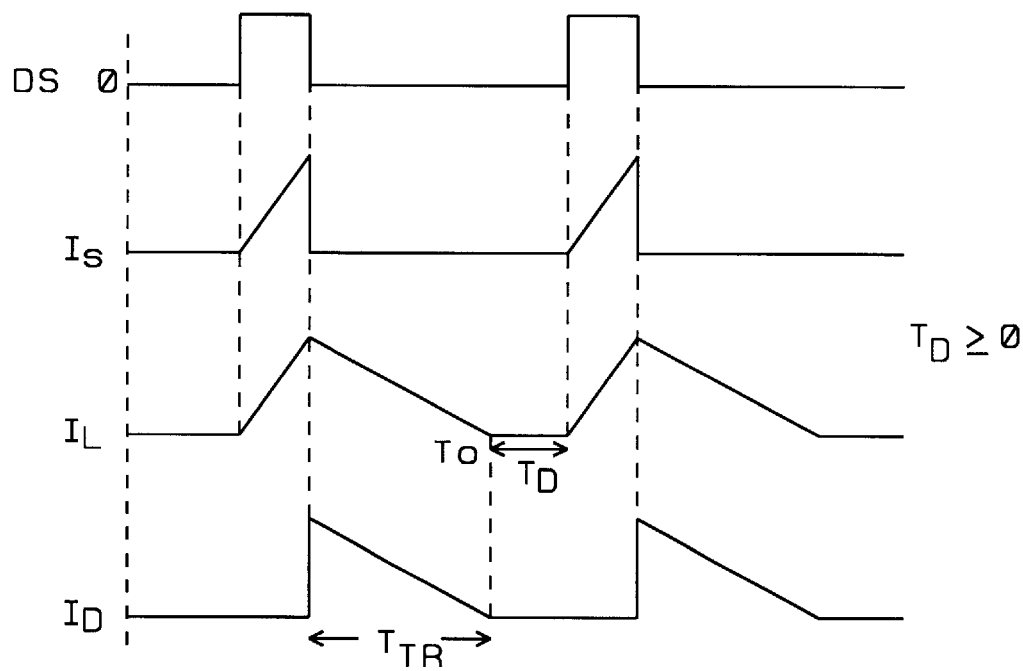
FIG. 2B illustrates the waveforms of the currents of FIG. 2A as functions of the switch S.

FIG. 2A shows the principal layout of a boost converter and FIG. 2B shows the flow of the currents flowing through the storage inductor L, the shunt switch S and the rectifying diode D. Said boost converter is operating in a discontinuous mode. The current Is starts to flow after the switch S is closed (or ON), the current $I_L$ is rising as long the switch S is ON (short pulse width) and is decreasing during the time period $T_{TR}$. The time period $T_D$ describes the time period when no current is flowing. In a discontinuous mode this time period must be equal or greater than zero. The current $I_D$ at the load side starts to flow when the switch S is opened (or in OFF state) and is decreasing during the period of energy transfer $T_{TR}$.

This invention proposes to calculate the point of time when the current through the storage inductor $I_L$ reaches the zero state. This happens always after the switch S is opened with the delay $T_{TR}$. $T_{TR}$ is the period of energy transfer. $T_{TR}$ can be calculated using the ON time Ton of the switch and the voltages U1 and Uc. The voltage across the storage inductor is $$U_L = L * \frac{dI}{dt}$$

Figure 3:
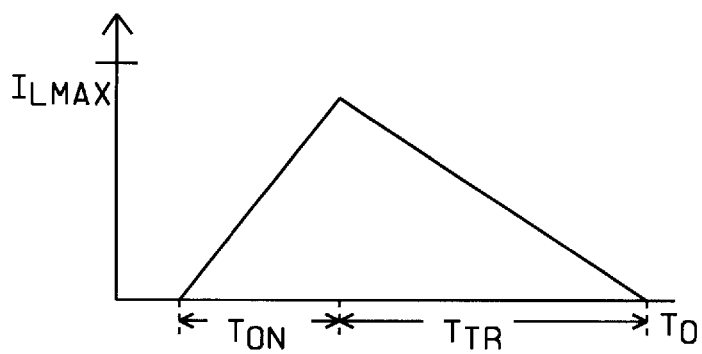
FIG. 3 illustrates the flow of the current $I_L$ through the storage inductor dependent of the ON time of the switch and the transfer time $T_{TR}$ of the energy.

The maximum current through the storage inductor (see FIG. 3 and FIGS. 2 A+B) is $$I_{LMAX} = \frac{U_1 - U_S}{L} * T_{ON}$$

During the time period the switch is closed the voltage Us equals zero. This means $$I_{LMAX} = \frac{U_1}{L} * T_{ON}$$

The transfer time $T_{TR}$ of the current $I_D$ is therefore $$T_{TR} = \frac{I_{LMAX} * L}{U_S - U_1} = \frac{U_1 * T_{ON}}{U_S - U_1}.$$

The forward voltage of the diode D is in the range of 0.7 Volts. In the forward mode $$U_S = U_C + 0.7 \text{ volts}$$

The final equation to calculate the transfer time is $$T_{TR} = \frac{U_1 * T_{on}}{U_C + 0.7 \text{ V} - U_1}$$

Using this equation the point of time To of the zero current state of the current $I_L$ can be calculated.

Figure 5:
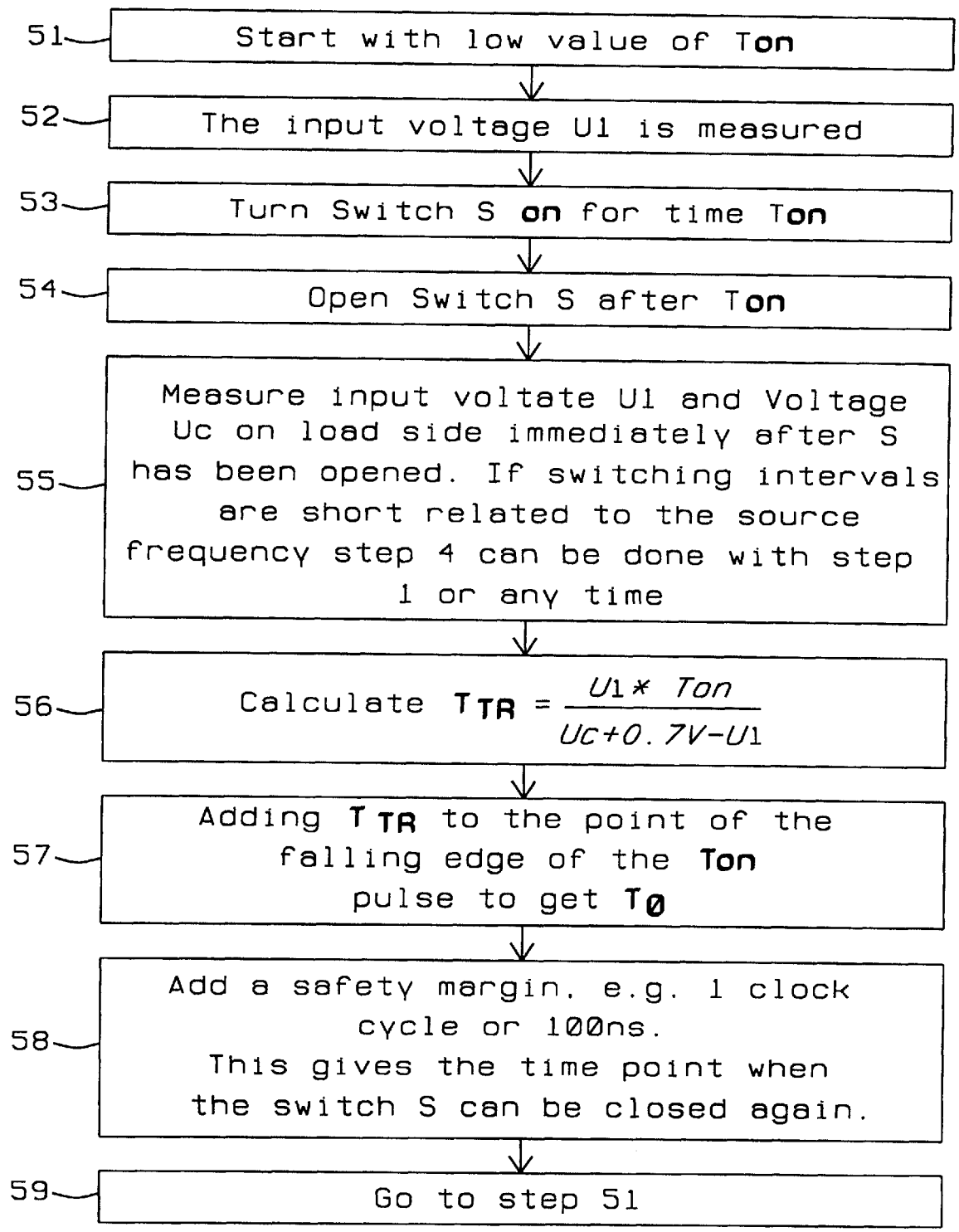
FIG. 5 illustrates one method how the point of time of zero current is calculated.

A method how to calculate said To is illustrated in FIG. 5. When the total system is inactive $$U_1 = U_S = U_C + 0.7 \text{ volts}.$$

In step 51 the system starts with a low value of Ton to avoid saturation of L. In step 52 the input voltage U1 is measured. In step 53 the shunt switch is closed for time Ton. In step 54 the switch S is opened after the pulse width Ton. In the next step 55 the voltages U1 at the source side and Uc at the load side are measured immediately after the switch is opened. Usually the switching frequency of the converter is much higher than the mains frequency or the variation of the voltage Uc. If switching intervals are short related to the frequency of the mains supply, which is the case under normal conditions of operations, these measurements can be performed any time but preferably in step 52 already when the input voltage U1 is measured and step 55 can be skipped. The noise level of U1 and Uc is much lower than at Us. In step 56 the digital control is calculating the transfer time period TTR according to the equation above. In step 57 TTR is added to the falling edge of the Ton pulse to get the point of time T0 of the zero current state of the current IL. In step 58 a safety margin of e.g. 1 clock cycle or 100 ns is added before the next cycle starts with step 52 again. This safety margin is required to avoid the risk that the converter goes into a continuous mode with great power dissipation. Above-mentioned method is used to define the frequency of the boost converter system.

Figure 4:
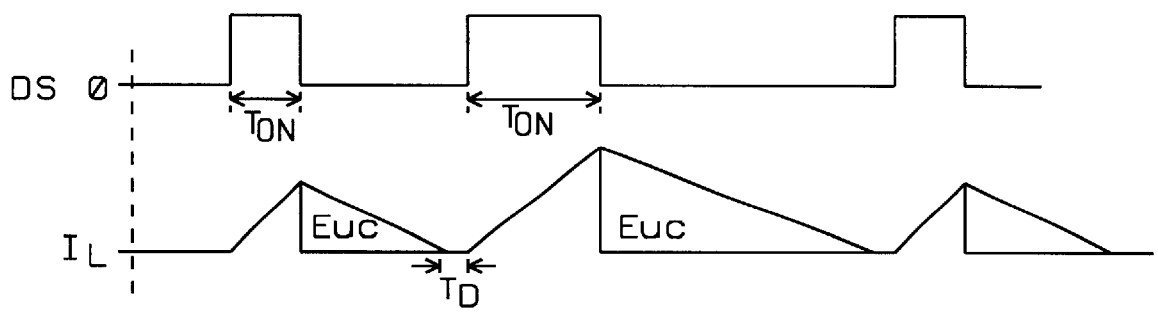
FIG. 4 illustrates the principal wave form of the current through the storage inductor $I_L$ related to the ON time of the switch and the period and the amount of energy transfer Euc related to the ON time.

The amount of energy transferred is mainly a function of the pulse width Ton. FIG. 4 illustrates how the pulse width Ton correlates to the energy transferred Euc. Power converters, that make low distortion and harmonics, need a fine adjustment of the ON time of the switch. But in digital systems the ON-time is discrete. In order to overcome the discreteness of the time steps an averaging of neighbouring discrete ON time values (pulse width) is introduced.

Figure 6:
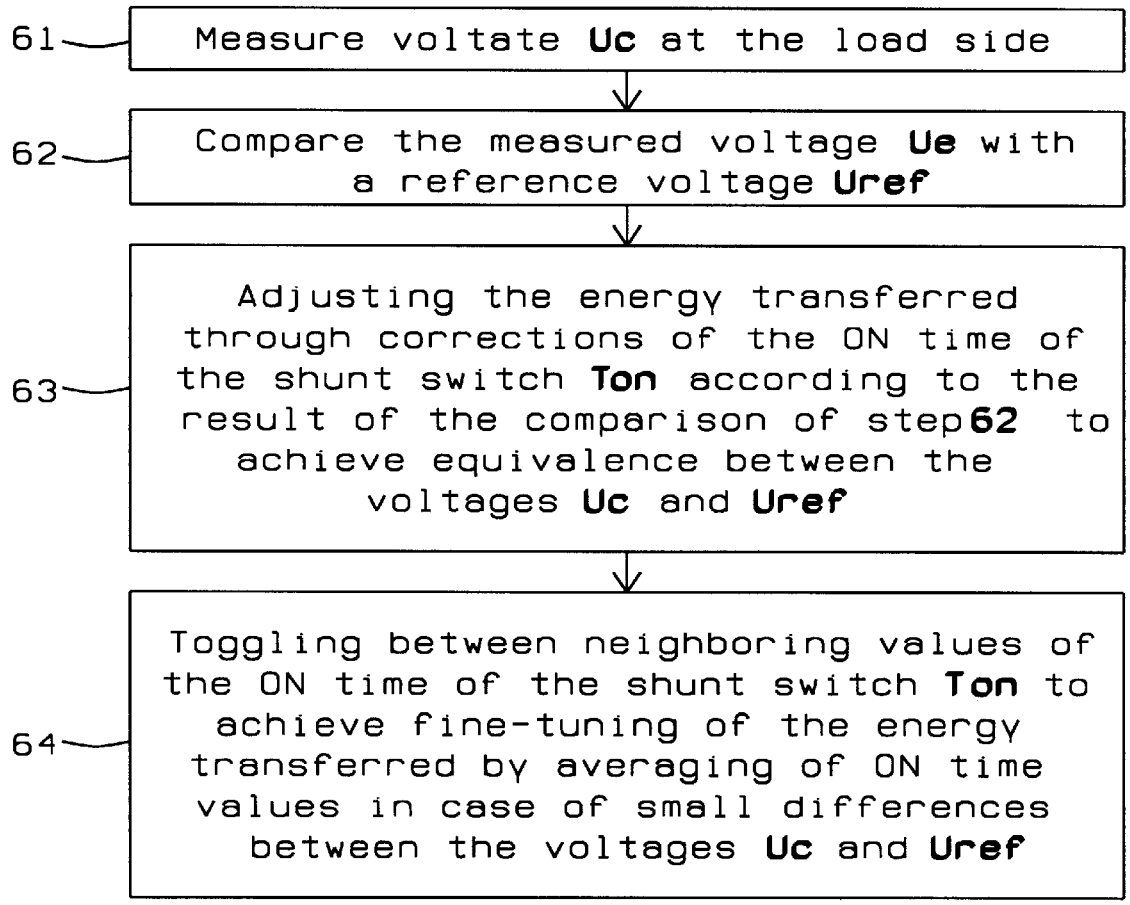
FIG. 6 illustrates one method how to do the fine adjustment of the energy transferred.

The method used for the fine adjustment of energy is illustrated in FIG. 6. In step 61 the voltage at the load side Uc is monitored through the voltage divider Z41 and Z42 and by the A/D converter of FIG. 1. In step 62 the digital control unit compares Uc with the reference voltage Uref (see FIG. 1) digitised as well by said A/D converter. In step 63+64 digital control unit is adjusting the pulse-width Ton according to the comparison result of Uc and Uref and is increasing or reducing the pulse-width Ton accordingly to reach equivalence between Uc and Uref in order to adjust the energy transferred. In the step 63 the gross adjustment is done. In case of small differences between Uc and Uref step 64 illustrates the averaging of neighboring Ton values to fine-tune the energy transferred. The averaging is done by either using defined patterns to vary the on time of the switch ("toggling") in minimal steps possible or by using digital delta-sigma modulation with a multilevel quantifier. One digital quantifier level corresponds to the period to load the storage inductor. The delta-sigma principle as an averaging principle makes the use of digital systems with moderate clock frequency possible. This fine adjustment of the ON time using a digital delta sigma modulator is very useful for a SEPIC (single ended primary inductor converter) when the load variation is large and the ON times of the switch are short. For the time period a SEOIC is inactive, Uc=0. Increasing switching frequency and increasing Ton increases Uc in all systems used.

For the said calculation of the point of time of the zero current state in the storage inductor and for the control of the pulse-width Ton by said comparison of Uc and Uref an accurate measurement of the voltage at the source side U1, the voltage on the storage inductor Us and the voltage at the load side Uc is necessary (see FIG. 1). This invention proposes to increase the accuracy of the measurement with a calibration of the voltage dividers $$\frac{Z11}{Z12}, \frac{Z21}{Z22}$$

and $$\frac{Z31}{Z32}$$

(see FIG. 1) to overcome the tolerances of the voltage dividers. This enables the usage of tolerant voltage dividers without losing accuracy of the measurement.

Figure 7:
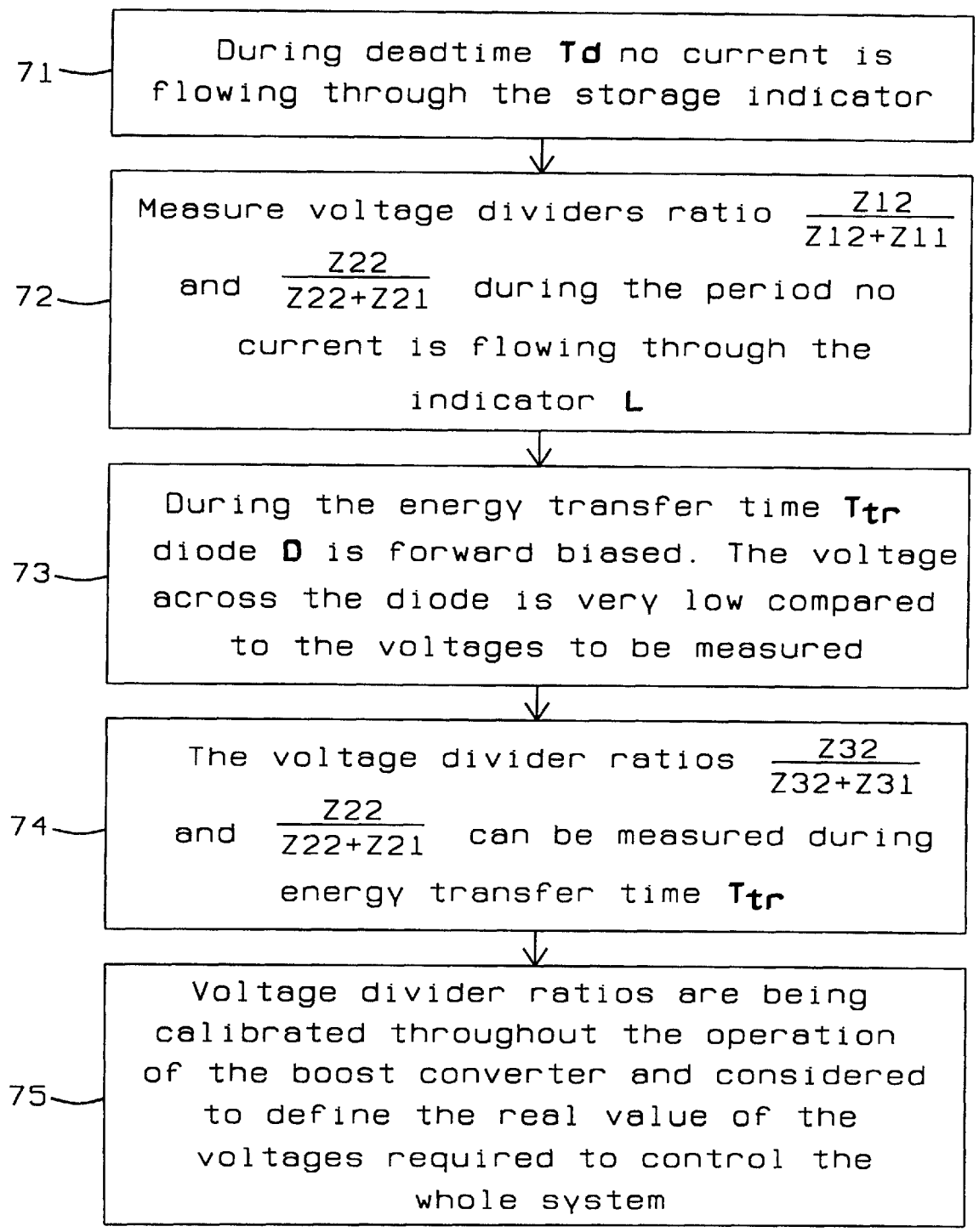
FIG. 7 illustrates one method how to improve the accuracy of voltage measurement by calibrating the voltage dividers.

FIG. 7 illustrates the method how and during which time periods the calibration can be performed. Step 71+72 explain the period of zero current state of the storage inductor is used to measure the ratios of the voltage dividers $$\frac{Z11}{Z11+Z12} \text{ and } \frac{Z21}{Z21+Z22}.$$

Step 73+74 explain that during the energy transfer period TTR the diode D is forward biased. The voltage across the diode D is well known, it is about 0.7 Volts and much lower than the voltage to be measured. During the forward bias of the diode D the voltage at the storage inductor Us equals the voltage at the load side Uc plus 0.7 Volts.

Hence the voltage divider ratios $$\frac{Z32}{Z32+Z31} \text{ and } \frac{Z22}{Z21+Z22}$$

can be measured. The digital control unit uses the measured values of the voltage divider ratios to calculate more precisely the point of time of the zero current state and to control more precisely the pulse width Ton.

The methods of (1) calculating the point of time of the zero current state of the storage inductor (FIG. 5) and of (2) of fine-adjusting of the energy transferred (FIG. 6) and of (3) improving the accuracy of voltage measurements by calibrating the voltage dividers (FIG. 7) can be used either individually or together in any combination. The highest efficiency of this kind of power supply combined with minimal distortion and harmonics will be achieved by a combination all three said methods together. For more simple requirements a solution could be achieved with just one or two of said methods.

While the invention has been particularly shown and described with reference to the preferred embodiments thereof, it will be understood by those skilled in the art that various changes in form and details may be made without departing from the spirit and scope of the invention.

What is claimed is:

1. A system used for converting electronic power supply energy as boost converters and other DC to DC converters having, related to the size of the storage inductor, maximal power transferred by recharging the storage inductor right after the point of time when zero current state occurs at the storage inductor comprising:
   a boost converter which includes a storage inductor coupled to an input voltage, a shunt switch controlling a current flowing through the storage inductor and a rectifying means for rectifying the output voltage;
   an analog/digital converter to convert analogue measured values into digital values; and
   a digital control means to control frequency and pulse width of the shunt switch using means to calculate the point of time when zero current state occurs and to calibrate voltage divider ratios.

2. The system of claim 1 wherein a PFC(power-factor-corrector) is used in said boost converter system.

3. The system of claim 1 wherein said digital control means is using means on the basis of the ON time of said shunt switch and the voltages measured at the source side (rectified mains supply) and at the load side to calculate the point of time when zero current state occurs adding a safety margin to balance inaccuracies of the measurement if required and furthermore initiate the recharging of the storage inductor by said digital control unit right after this point of time.

4. The system of claim 3 wherein a PFC(power-factor-corrector) is used in said boost converter system.

5. The system of claim 1 wherein said digital control means is using means on the basis of the voltage measured at the load side and of a comparison of said voltage with a reference voltage to fine-adjust the energy transferred by fine-tuning the pulse width of said shunt switch minimising distortion and harmonics overcoming the limitations of discrete time steps in clocked digital systems by toggling between neighbouring ON time values (pulse width) using averaging ON time values of said switch using patterns or a digital delta sigma modulator.

6. The system of claim 5 wherein a PFC(power-factor-corrector) is used in said boost converter system.

7. The system of claim 1 wherein the accuracy of measurements of voltages required to control the system is improved by using voltage dividers wherein their voltage divider ratios are being calibrated through the operation of the system and said calibrated voltage divider ratios are being considered to define the precise value of the voltages.

8. The system of claim 7 wherein a PFC (power-factor-corrector) is used in said boost converter system.

9. The system of claim 3 wherein said digital control means is using means on the basis of the ON time of said shunt switch and the voltages measured at the source side (rectified mains supply) and at the load side to calculate the point of time when zero current state occurs adding a safety margin to balance inaccuracies of the measurement if required and furthermore initiate the recharging of the storage inductor by said digital control unit right after this point of time combined with the system of claim 5 wherein said digital control means is using means on the basis of the voltage measured at the load side and of a comparison of said voltage with a reference voltage to fine-adjust the energy transferred by fine-tuning the pulse width of said shunt switch minimising distortion and harmonics overcoming the limitations of discrete time steps in clocked digital systems by toggling between neighboring ON time values (pulse width) using averaging ON time values of said switch using patterns or a digital delta sigma modulator.

10. The system of claim 9 wherein a PFC(power-factor-corrector) is used in said boost converter system.

11. The system of claim 3 wherein said digital control means is using means on the basis of the ON time of said shunt switch and the voltages measured at the source side (rectified mains supply) and at the load side to calculate the point of time when zero current state occurs adding a safety margin to balance inaccuracies of the measurement if required and furthermore initiate the recharging of the storage inductor by said digital control unit right after this point of time combined with the system of claim 7 wherein the accuracy of measurements of voltages required to control the system is improved by using voltage dividers wherein their voltage divider ratios are being calibrated through the operation of the system and said calibrated voltage divider ratios are being considered to define the precise value of the voltages.

12. The system of claim 11 wherein a PFC (power-factor-corrector) is used in said boost converter system.

13. The system of claim 5 wherein said digital control means is using means on the basis of the voltage measured at the load side and of a comparison of said voltage with a reference voltage to fine-adjust the energy transferred by fine-tuning the pulse width of said shunt switch minimising distortion and harmonics overcoming the limitations of discrete time steps in clocked digital systems by toggling between neighboring ON time values (pulse width) using averaging ON time values of said switch using patterns or a digital delta sigma modulator combined with the system of claim 7 wherein the accuracy of measurements of voltages required to control the system is improved by using voltage dividers wherein their voltage divider ratios are being calibrated through the operation of the system and said calibrated voltage divider ratios are being considered to define the precise value of the voltages.

14. The system of claim 13 wherein a PFC (power-factor-corrector) is used in said boost converter system.

15. The method for calculating the point of time of the zero current state of said storage inductor comprising:

providing a boost converter which includes a storage inductor coupled to an input voltage, a shunt switch controlling a current flowing through said storage inductor and a rectifying means for rectifying the output voltage; and a digital control means to control frequency and pulse width of said shunt switch;

measuring the input voltage;

turning on said shunt switch for a time;

opening said shunt switch after said time;

measuring of the input voltage and the voltage on the load side immediately after said shunt switch has been opened, if switching intervals are short related to the source frequency said measurements can be performed at same time as above mentioned measurement of the input voltage just before turning on the shunt switch;

calculating said point of time of the zero current state; and adding the said point of time of the zero current state to the point of the falling edge of the said time and add additionally a safety margin, if required, to get the point of time when said switch can be closed again.

16. The method of claim 15 wherein said rectifying means is a rectifying diode and the calculation of said point of time of zero current $$T_{TR} = \frac{U_1 * T_{on}}{U_C + 0.7\ V - U_1}$$

wherein $U_1$ is the measured voltage at the source side and $U_C$ is the voltage measured at the load side and $T_{ON}$ is the pulse width of the said shunt switch.

17. The method for the fine-adjustment of the energy transfer by fine-tuning the pulse width of a shunt switch comprising:

providing a boost converter which includes a storage inductor coupled to an input voltage, a shunt switch controlling a current flowing through said storage inductor, a rectifying means for rectifying the output voltage and voltage dividers at the source side, the load side and at the load side of the inductor, a A/D converter to convert the measurement results to digital values and a digital control means to control frequency and pulse width of said shunt switch;

measuring the voltage at the load side;

comparing said voltage at the load side with a reference voltage;

adjusting the energy transferred through corrections of the ON time of said shunt switch according to the results of said comparisons to achieve equivalence between the output voltage and the reference voltage; and toggling between neighbouring values of the ON time of the shunt switch T<sub>ON</sub> to achieve fine-tuning of the energy transferred by averaging of ON time values in case of small differences between the voltage at the load side U<sub>C</sub> and the reference voltage U<sub>REF</sub>.

18. The method of calculating the point of time of the zero current state of a storage inductor and of fine-adjusting the energy transfer by fine-tuning of the pulse width of a shunt switch comprising:

providing a boost converter which includes a storage inductor coupled to an input voltage, a shunt switch controlling a current flowing through said storage inductor, a rectifying means for rectifying the output voltage and voltage dividers at the source side, the load side and at the load side of the inductor, a AD converter to convert measurement results and reference voltages to digital values and a digital control means to control frequency and pulse width of said shunt switch;

measuring the input voltage;

turning on said shunt switch for a time;

opening said shunt switch after said time;

measuring of the input voltage and the voltage on the load side immediately after said shunt switch has been opened, if switching intervals are short related to the source frequency said measurements can be performed at same time as above mentioned measurement of the input voltage just before turning on the shunt switch;

comparing said voltage at the load side with a reference voltage;

adjusting the energy transferred through corrections of the ON time of said shunt switch according to the results of said comparisons to achieve equivalence between the output voltage and the reference voltage;

toggling between neighboring values of the ON time of the shunt switch T<sub>ON</sub> to achieve fine-tuning of the energy transferred by averaging of ON time values in case of small differences between the voltage at the load side and the reference voltage;

calculating said point of time of the zero current state; and adding the said point of time of the zero current state to the point of the falling edge of the said time and add additionally a safety margin, if required, to get the point of time when said switch can be closed again.

19. The method of claim 18 wherein a diode is used for rectifying and the point of time of zero current is calculated using the equation $$T_{TR} = \frac{U_1 * T_{on}}{U_C + 0.7 \text{ V} - U_1}$$

wherein U<sub>1</sub> is the measured voltage at the source side and U<sub>C</sub> is the voltage measured at the load side and T<sub>ON</sub> is the pulse width of the said shunt switch.

20. The method to improve the accuracy of the measurement of the voltages required to control the system as e.g. the frequency and the pulse width of the shunt switch is achieved by a calibration of the tolerances of voltage dividers e.g. at the load side, the inductor side and at the source side at appropriate periods of time through a measurement of the voltage divider ratio considering the small influence of the voltage of the forward bias of the diode hence enabling the usage of tolerant voltage dividers comprising:

providing a boost converter which includes a storage inductor coupled to an input voltage, a shunt switch controlling a current flowing through said storage inductor, a rectifying means for rectifying the output voltage and voltage dividers at the source side, the load side and at the load side of the inductor, a A/D converter to convert the measurement results to digital values and a digital control means to calibrate the voltage divider ratios;

measuring the ratios of the voltage dividers at the source side and at the load side of the storage inductor during the short time period when no current is flowing through the inductor;

measuring the ratios of the voltage dividers at the output side of the boost converter and at the output side of the storage inductor during the period of time energy is transferred and the rectifying means is forward biased and hence the voltage at e.g. the diode is low compared to the voltages measured; and calibrating the voltage divider ratios throughout the operation of the boost converter and considered to define the real value of the voltages required to control the whole system.

21. The method of the fine adjustment of the energy transfer by fine-tuning the pulse width of the shunt switch combined with the method of the improved accuracy of the measurement of the voltages by calibrating the tolerances of the voltage divider on the load side comprising;

providing a boost converter which includes a storage inductor coupled to an input voltage, a shunt switch controlling a current flowing through said storage inductor, a rectifying means for rectifying the output voltage and voltage dividers at the source side, the load side and at the load side of the inductor, an A/D converter to convert measurement results and reference voltages to digital values and a digital control means to control frequency and pulse width of said shunt switch;

measuring the ratios of the voltage dividers at the output side of the boost converter during the period of time energy is transferred;

measuring the voltage at the load side;

comparing said voltage at the load side with a reference voltage;

adjusting the energy transferred through corrections of the ON time of said shunt switch according to the results of said comparisons to achieve equivalence between the output voltage and the reference voltage; and toggling between neighbouring values of the ON time of the shunt switch T<sub>ON</sub> to achieve fine-tuning of the energy transferred by averaging of ON time values in case of small differences between the voltage at the load side U<sub>C</sub> and the reference voltage U<sub>REF</sub>.

22. The method of calculating the point of time of the zero current state of the storage inductor together with the improvement of the accuracy of the measurement of the voltages involved by a calibration of voltage dividers comprising;

providing a boost converter which includes a storage inductor coupled to an input voltage, a shunt switch controlling a current flowing through said storage inductor, a rectifying means for rectifying the output voltage and voltage dividers at the source side, the load side and at the load side of the inductor, an A/D converter to convert measurement results and reference voltages to digital values and a digital control means to control frequency and pulse width of said shunt switch;

measuring the ratios of the voltage dividers at the source side and at the load side of the storage inductor during the short time period when no current is flowing through the inductor;

measuring the input voltage considering the measured ratios of the voltage divider at the source side;

turning on said shunt switch for a time;

opening said shunt switch after said time;

measuring the ratios of the voltage dividers at the output side of the boost converter and at the output side of the storage inductor during the period of time energy is transferred and the rectifying means is forward biased and hence the voltage at e.g. the diode is low compared to the voltages measured;

measuring of the input voltage and the voltage on the load side immediately after said shunt switch has been opened considering the measured ratios of the voltage dividers at the source and at the load side, if switching intervals are short related to the source frequency said measurements can be performed at same time as above mentioned measurement of the input voltage just before turning on the shunt switch; calculating said point of time of the zero current state; and adding the said point of time of the zero current state to the point of the falling edge of the said time and add additionally a safety margin, if required, to get the point of time when said switch can be closed again.

23. The method of claim 22 wherein a diode is used for rectifying and the point of time of zero current is calculated using the equation $$T_{TR} = \frac{U_1 * T_{on}}{U_C + 0.7 \text{ V} - U_1}$$

wherein U1 is the measured voltage at the source side and UC is the voltage measured at the load side and TON is the pulse width of the said shunt switch.

24. The method of calculating the point of time of the zero current state of the storage inductor together with the method of a fine adjustment of the energy transfer by fine-tuning of the pulse width of the shunt switch and additionally with the method of an improvement of the accuracy of the measurement of the voltages by a calibration of the voltage dividers comprising;

providing a boost converter which includes a storage inductor coupled to an input voltage, a shunt switch controlling a current flowing through said storage inductor, a rectifying means for rectifying the output voltage and voltage dividers at the source side, the load side and at the load side of the inductor, an A/D converter to convert measurement results and reference voltages to digital values and a digital control means to control frequency and pulse width of said shunt switch;

measuring the input voltage;

turning on said shunt switch for a time;

opening said shunt switch after said time;

measuring of the input voltage and the voltage on the load side immediately after said shunt switch has been opened, if switching intervals are short related to the source frequency said measurements can be performed at same time as above mentioned measurement of the input voltage just before turning on the shunt switch;

comparing the measured voltage at the load side with the reference voltage;

adjusting the energy transferred through corrections of the ON time of said shunt switch according to the results of said comparisons to achieve equivalence between the output voltage and the reference voltage;

toggling between neighboring values of the ON time of the shunt switch TON to achieve fine-tuning of the energy transferred by averaging of ON time values in case of small differences between the voltage at the load side and the reference voltage;

calculating said point of time of the zero current state;

calculating said point of time of the zero current state; and adding the said point of time of the zero current state to the point of the falling edge of the said time and add additionally a safety margin, if required, to get the point of time when said switch can be closed again.

25. The method of claim 24 wherein a diode is used for rectifying and the point of time of zero current is calculated using the equation $$T_{TR} = \frac{U_1 * T_{on}}{U_C + 0.7 \text{ V} - U_1}$$

wherein U1 is the measured voltage at the source side and UC is the voltage measured at the load side and TON is the pulse width of the said shunt switch.

* * * * *